(No Model.)
J. G. ALISON.
INDICATOR FOR THE MOTIONS OF THE ENGINES IN STEAMSHIPS.
No. 407,503. Patented July 23, 1889.
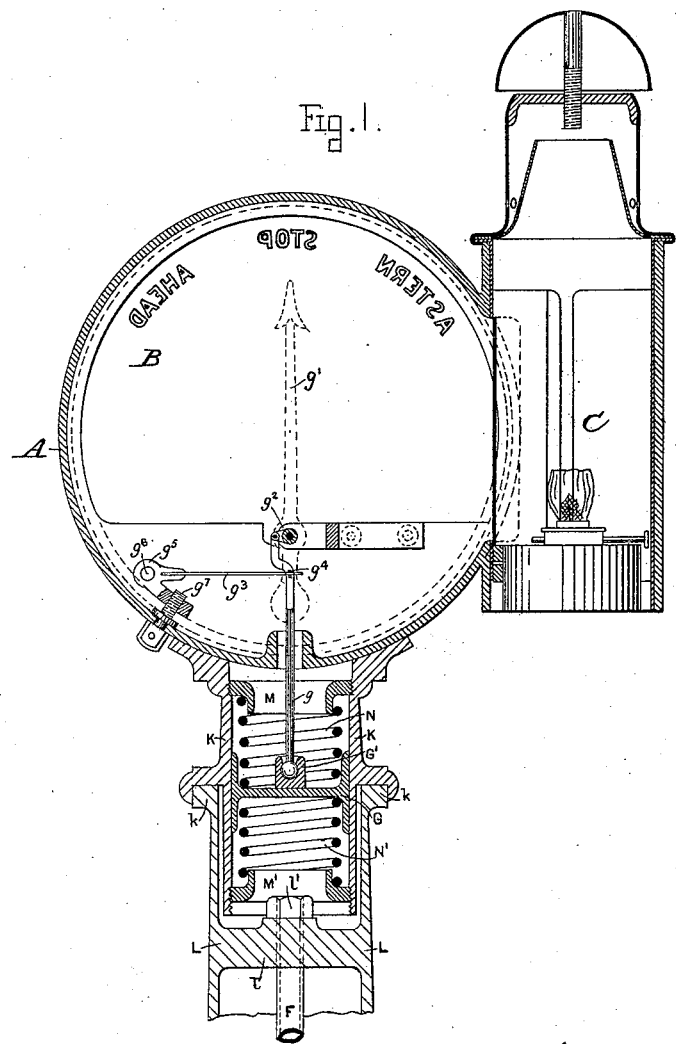
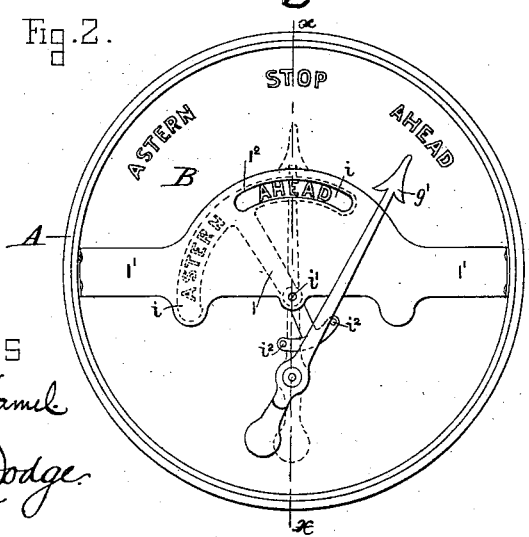
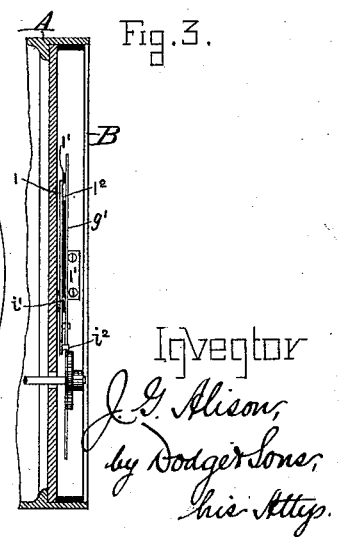

UNITED STATES PATENT OFFICE.

JAMES GORDON ALISON, OF BIRKENHEAD, COUNTY OF CHESTER, ENGLAND.

INDICATOR FOR THE MOTIONS OF THE ENGINES IN STEAMSHIPS.

SPECIFICATION forming part of Letters Patent No. 407,503, dated July 23, 1889.

Application filed July 23, 1887. Serial No. 245,110. (No model.)

*To all whom it may concern:*

Be it known that I, JAMES GORDON ALISON, a subject of the Queen of Great Britain, residing at Birkenhead, in the county of Chester, in the Kingdom of England, have invented certain new and useful Improvements in Indicators of the Motions of the Engines on Steamships, &c., of which the following is a specification.

My invention relates to indicators for use upon vessels; and it consists in a novel construction of the indicator, by which the last direction or motion of the vessel is indicated.

The invention further consists in various features and details, hereinafter set forth and claimed.

In the drawings, Figure 1 is a sectional elevation of the indicator as a whole; Fig. 2, a face view of the dial, showing the pointer and semaphores; and Fig. 3 a sectional view on the line $x\ x$ of Fig. 2.

The broad idea of actuating the pointer and semaphore by means of the pulsations of a fluid, which take place synchronously with the movements of the engine, is not claimed by me, as it is embraced in an application filed August 25, 1888, by Edouard Lambinet, Serial No. 283,703, the pulsations of the fluid in such case causing the pointer to oscillate to one or the other side of a neutral line, according as the pulsations of the fluid under pressure are above or below a predetermined degree.

Any suitable fluid may be employed to actuate the indicator, said fluid being conveyed to the cylinder or chamber of the indicator by means of a pipe F, as shown in Fig. 1.

A indicates the shell or case of the indicator, provided with a dial B and a lantern C, as is usual in this class of devices.

I' indicates a cross-bar or bridge secured to the case or shell A and provided with a curved opening $I^2$. Pivoted to the rear face of the bridge I' at $i'$ is an arm I, carrying at its upper end a semaphore or semaphores $i$, bearing inscriptions which are adapted to be brought into line with the opening $I^2$. Below the pivot $i'$ the arm I is provided with lateral extensions, from the front face of which project pins $i^2\ i^2$. (Shown in Figs. 2 and 3.)

A pointer $g'$ is pivoted in the shell or casing, or in an arm or bracket secured thereto, and its shaft is provided with a radial arm $g^2$, as shown in Fig. 1. The pivot of the pointer is below that of the semaphore-arm I, and the said pointer is so arranged relatively to the latter that one or the other of the pins $i^2\ i^2$ will be struck by the pointer when the latter moves. A rod or stem $g$ is connected with the arm $g^2$ at one end and with a moving device, as G, (which in the present instance is a piston,) at the other end, the said device G being adapted and arranged to impart a reciprocating motion to the stem. In lieu of the form of connection shown between the stem $g$ and the shaft of the pointer, any other mechanical arrangement may be employed—such, for instance, as a rack and pinion.

A block $g^5$ is pivoted within the case or shell A upon a stud $g^6$, the said block being provided with a spring $g^3$, which engages the studs or pins $g^4$ on the stem $g$ and aids in maintaining the pointer at the zero-point. In order to vary the force or effect of this spring, I employ a screw $g^7$, swiveled in the case or shell and engaging with the block $g^5$, as shown in Fig. 1.

Upon the dial are the words "Astern," "Stop," and "Ahead," while upon the semaphores are corresponding words "Astern" and "Ahead," only one of which latter words is, however, visible at one time through the opening $I^2$.

When the vessel is going ahead, the parts will be in the position shown in Fig. 2, the pointer opposite the word "Ahead" on the dial and the semaphore displaying said word through the opening $I^2$. If the order to stop should now be given, the pointer would be brought to the position indicated by dotted lines in Figs. 1 and 2, while the semaphore would remain at rest, thus indicating that the order last given prior to stopping was to go ahead. If the vessel be now started with the command "Astern," the pointer would be thrown over so as to point to the word "Astern" on the dial, and thus in moving or swinging upon its pivot it would strike one of the pins $i^2$ and throw the semaphore over to such position as to bring the word "Astern" thereon opposite the opening I². From this construction and arrangement it will be seen that the order last given will be indicated positively by the semaphore or semaphores.

The means by which the pulsations given the fluid in the pipe F are communicated to the pointer are illustrated in Fig. 1. Secured to the shell or case A is a cylinder K, open at both ends, within which works a piston G, connected with the stem $g$ by a ball-and-socket joint G'. Screwing into the end of the cylinder are rings or abutments M M', between the inner faces of which and the piston G are placed springs N N', which tend to maintain the pointer at the zero-point. This cylinder fits within the upper end of a hollow post or standard L, and is secured by an air-tight joint to a flange $k$ of the post or standard. Pipe F passes up through the post or standard and through a flange or web $l$ thereof, the said pipe being secured by a nut $l'$, so as to form an air-tight joint.

In lieu of the words herein shown other words of command may be employed.

If the engine is at rest, the air or other fluid in the tube F is at atmospheric pressure, the piston G in its normal position, and the pointer at zero or "Stop," the semaphore showing either "Ahead" or "Astern," according to the last motion of the engine. If the word of command "Ahead" is given, a pump connected with the engine causes a difference (for instance, an increase) in pressure in the pipe F, and as a result the piston vibrates between its normal point and any point below it, and thereby causes the pointer to oscillate at each stroke between zero "Stop" and "Ahead." When the command "Stop" is given, the engine stops and the action of the pump on the fluid in pipe F ceases. The pressure within the tube then rises to zero, and the pointer indicates "Stop," but the semaphore still shows "Ahead." If the command "Astern" is now given and the engine reversed, the pump is again set to work and creates a difference (say, for instance, a decrease) in the pressure in the pipe F; but the needle now oscillates between "Stop" and "Astern" on the dial, kicking the semaphore over to "Astern" as it passes the zero or "Stop" point. The needle oscillating once with each stroke, the officer in command can determine the speed of the engine. From this construction and arrangement it will be seen that when the pressure within the pipe falls below a predetermined degree the pointer will oscillate to one side of the zero-point ("Stop;") but when the pressure exceeds the predetermined degree the pointer will oscillate to the other side of the zero-mark.

Having thus described my invention, what I claim is—

1. In an indicator, the combination, with pipe F and cylinder K, of piston G, fitting therein, a dial, a pointer connected with the piston, and springs upon opposite faces of the piston adapted to maintain the pointer normally at the zero-point.

2. In an indicator, the combination, with pipe F, cylinder K, and piston G, of abutments or rings M M', screwing into the ends of the cylinder, springs N N', bearing at one end against the piston and at the other end upon the abutments, and a pointer connected with and adapted to be operated by the piston.

3. In an indicator for ships, &c., the combination, with the standard L, having the internal web or flange $l$ near its upper end and hollow above the flange, of an indicating mechanism, substantially such as shown, secured to the upper end of the standard, and a pipe F passing through the web or flange and adapted to convey the actuating force to the indicating mechanism.

4. In combination with a standard L, provided with an internal web or flange $l$ and with a hollow upper end, an indicating mechanism provided with a cylinder K to set into the upper end of the standard, and a pipe F passing through the web or flange and communicating with the cylinder to convey the actuating fluid to the interior of the latter.

5. In combination with a dial, a pointer, a pair of semaphores connected together and adapted to be engaged and actuated by the pointer, and mechanism, substantially such as shown, for actuating the pointer.

6. In an indicator, the combination, with a dial, of a pointer, a moving part G for imparting motion to the pointer, two semaphores connected one with the other and adapted to be actuated by the pointer, and a pipe F to convey fluid to the part G to cause the proper movements of the latter.

7. In an indicator, the combination, with a dial, of a pointer, a moving part G for imparting motion to the pointer, two semaphores connected one with the other and marked to correspond with the dial, said semaphores being adapted to be actuated by the pointer, and a pipe F to convey fluid to the part G to cause the proper movements of the latter.

8. In combination with the semaphores, a dial, a pivoted arm carrying the semaphores, a pivoted pointer and means for actuating the same, and pins $i^2$ $i^2$, secured to the pivoted arm and adapted to be struck by the pointer.

9. In combination with an oscillating pointer and means for actuating the same, pivoted semaphores $i$ $i$, connected one with the other and engaging and actuated by the pointer.

10. In combination with a dial, a bridge I', having an open space I², a pair of semaphores carried by a pivoted arm and adapted to pass in line with the space I², pins $i^2$ $i^2$, carried by the pivoted arm, and a pointer adapted to strike the pins on the arm, whereby, whenever the pointer passes to one side or the other of the zero-line, the semaphores will be thrown over.

11. In an indicator, the combination, with a shell or casing, of a pointer $g'$, swiveled therein and provided with an arm $g^2$, a rod or stem $g$, connected with the arm, and a spring $g^3$, secured to the shell and engaging with the rod or stem.

12. In an indicator, the combination, with a casing, of a shaft having an arm $g^2$, a pointer connected with the shaft, a stem $g$, connected with the arm, a bolt $g^6$, pivoted in the shell and provided with a spring $g^3$ to engage the stem $g$, and a screw $g^7$, swiveled in the case and engaging the block.

In testimony whereof I have signed my name to this specification in the presence of two subscribing witnesses.

JAMES GORDON ALISON.

Witnesses:
 WM. P. THOMPSON,
 C. COVENTRY.